United States Patent
Parsadayan

(10) Patent No.: US 12,027,006 B1
(45) Date of Patent: Jul. 2, 2024

(54) LIDAR-ASSISTED ACCESS CONTROL SYSTEMS AND METHODS

(71) Applicant: INTELLIGENT ENTRY MACHINES LLC, Irvine, CA (US)

(72) Inventor: Andrew Parsadayan, Newport Coast, CA (US)

(73) Assignee: Intelligent Entry Machines LLC, Irvine, CA (US)

( * ) Notice: Subject to any disclaimer, the term of this patent is extended or adjusted under 35 U.S.C. 154(b) by 559 days.

(21) Appl. No.: 17/205,989

(22) Filed: Mar. 18, 2021

Related U.S. Application Data

(60) Provisional application No. 62/993,354, filed on Mar. 23, 2020.

(51) Int. Cl.
- G07C 9/10 (2020.01)
- G01S 7/48 (2006.01)
- G01S 17/04 (2020.01)
- G01S 17/86 (2020.01)
- G05B 19/042 (2006.01)

(52) U.S. Cl.
CPC .............. G07C 9/10 (2020.01); G01S 17/04 (2020.01); G01S 17/86 (2020.01); G05B 19/042 (2013.01); G01S 7/4802 (2013.01); G05B 2219/24024 (2013.01)

(58) Field of Classification Search
CPC ............ G07C 9/10; G01S 17/86; G01S 17/04
USPC ......................................................... 700/275
See application file for complete search history.

(56) References Cited

U.S. PATENT DOCUMENTS

| | | | |
|---|---|---|---|
| 6,641,091 B1 * | 11/2003 | Hilleary | B61L 29/08 246/111 |
| 7,944,548 B2 | 5/2011 | Eaton | |
| 11,052,929 B1 * | 7/2021 | Lucas | B61L 23/041 |
| 2002/0185571 A1 * | 12/2002 | Bryant | B61L 29/30 246/125 |
| 2013/0018534 A1 * | 1/2013 | Hilleary | B61L 29/30 701/19 |
| 2014/0339374 A1 * | 11/2014 | Mian | B61L 29/30 246/473.1 |
| 2015/0192677 A1 | 7/2015 | Yu et al. | |
| 2019/0042865 A1 | 2/2019 | Vallespi-Gonzalez et al. | |

(Continued)

FOREIGN PATENT DOCUMENTS

| | | | | |
|---|---|---|---|---|
| CA | 2776192 A1 * | 11/2012 | ............ | B61L 23/041 |
| JP | 2019114000 A * | 7/2019 | | |

(Continued)

OTHER PUBLICATIONS https://www.gazettelive.co.uk/news/teesside-news/relief-motorists-pedestrians-new-wind-10595740; 10 pages; printed from the Internet on Aug. 8, 2023.*

(Continued)

*Primary Examiner* — Ronald D Hartman, Jr.

(74) *Attorney, Agent, or Firm* — Martin Fessenmaier; Umberg Zipser LLP

(57) ABSTRACT

Systems and methods are presented that use a LIDAR sensor to detect and/or identify an object in proximity of an access control device, and especially a movable barrier. Most typically, the LIDAR sensor provides for a 2D scan area that is offset from and substantially parallel to the movable barrier while the movable barrier moves from the first position to the second position.

30 Claims, 2 Drawing Sheets

(56) References Cited

U.S. PATENT DOCUMENTS

2019/0212103 A1    7/2019  Marcy et al.
2020/0240198 A1 *  7/2020  Cate ..................... H04W 4/80

FOREIGN PATENT DOCUMENTS

WO    WO-2019147306 A1 *  8/2019  ............ B61L 29/228
WO       2020002997 A2     1/2020

OTHER PUBLICATIONS

BEA Product Showcase: LZR-H100—YouTube dated Feb. 4, 2019, BEA Sensors Americas, Pittsburgh, PA; 3 pgs. Downloaded at https://www.youtube.com/watch?v=LZK0lloG2xl.

LZR-130 Product Data Sheet, BEA Americas, Pittsburgh, PA; 9 pgs. Downloaded May 18, 2021 at https://us.beasensors.com/en/product/lzr-i30/#videos.

* cited by examiner

LIDAR-ASSISTED ACCESS CONTROL SYSTEMS AND METHODS

CROSS-REFERENCE DATA

This patent application claims a priority date benefit of a Provisional U.S. Patent Application No. 62/993,354 filed 23 Mar. 2020 with the same title, which is incorporated herein in its entirety by reference.

FIELD OF THE INVENTION

The present disclosure relates to devices, systems, and methods of access control and safety systems therefor.

BACKGROUND OF THE INVENTION

The background description includes information that may be useful in understanding the present disclosure. It is not an admission that any of the information provided herein is prior art or relevant to the presently claimed invention, or that any publication specifically or implicitly referenced is prior art.

All publications and patent applications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Light detection and ranging (LIDAR) is a well-known technology for terrain mapping using a stationary LIDAR device as is disclosed, for example, in U.S. Pat. No. 7,944,548B2. In addition, the use of LIDAR has also found a large number of applications where the LIDAR device is mounted on a moving vehicle to detect other vehicles, obstacles, and pedestrians as is described, for example, in US 2015/0192677 or US 2019/0042865. In further known uses, LIDAR sensing has been used to classify specific animals in an environment and to operate a gating mechanism that only allows a specific class of animals to access a holding space or quarantine as in known from WO 2020/002997. In still further known uses, as disclosed in US 2019/0212103, the latching status and gate segment position of a floating port security barrier is ascertained using LIDAR sensors. Thus, LIDAR sensing is relatively common on objects moving through an operational space to provide situational awareness and/or detect items in relative proximity. On the other hand, LIDAR sensing is also known on non-moving platforms to identify and/or map objects in relative proximity to the platform.

Access control devices, and especially those with moving barriers typically employ one or more safety devices that stop the movement of the moving barrier where an obstacle is in or will likely enter the path of the moving barrier. Most typically, such safety devices are conceptually relatively simple and may employ a light beam directed at a photocell, wherein an interruption of the light beam as detected by the photocell will halt the movement of the gate. However, such systems are typically unsuitable in situations where interfering movement is encountered (e.g., pedestrians, animals, wind-blown leaves, etc.) or where unfavorable light conditions are present. To circumvent such issues, a video system may be employed to detect obstacles within the range of motion of a moving barrier. However, such systems are also prone to environmental interference and are often more complex to deploy and operate. In still other methods, the motion of a moving barrier can be halted where an increased motor torque to drive the barrier is detected, and where the increased torque is due to an obstacle contacting the barrier. While conceptually relatively simple, such systems will not avoid inadvertent contact of the barrier with the obstacle.

Notably, LIDAR has not been used as a safety mechanism in access control devices, and especially in traffic or other public access gates to identify/detect an operational safety hazard. Therefore, even though various LIDAR and safety devices are known in the art, all or almost all of them suffer from various disadvantages. Consequently, there is a need to provide novel systems and methods that provide improved operational safety in access control systems.

SUMMARY OF THE INVENTION

Various systems and methods are contemplated that use a LIDAR sensor to assist in the control and/or operation of various access control devices, especially to increase safety in the operation of movable gates or other movable barriers.

In one aspect of the inventive subject matter, the inventors contemplate an access control system that includes a movable barrier that is movably coupled to a stationary structure, wherein the movable barrier is movable between a first position and a second position, and wherein the barrier blocks access therethrough to an area behind the gate, such as for example a restricted (e.g., residential) area when the barrier is in the first position and wherein the barrier allows access therethrough when the barrier is in the second position. Contemplated systems include a LIDAR sensor that is configured to sense an object within a 2D scan area, wherein the LIDAR sensor is coupled to the moving barrier or the stationary structure such that the 2D scan area is offset (e.g., between 1-20 cm) from and substantially parallel to the movable barrier while the movable barrier moves from the first to the second position. Additionally, contemplated systems also include a controller that is coupled to an operator of the movable barrier and the LIDAR sensor, wherein the controller is configured to change the movement of the movable barrier (e.g., to reduce speed or interrupt of movement) upon detection or identification of an object in the 2D scan area.

While some LIDAR sensors operate in a single 2D plane, others operate in a plurality of closely positioned planes emitting and collecting a plurality of scans at the same time in order to increase the reliability of their operation. The term "2D scan area" is used herein to encompass both single and multiple scan areas located close to each other.

As will be readily appreciated, the movable barrier may be configured to pivotably or slidably move between the first position and the second position. Preferably, but not necessarily the LIDAR sensor is configured to use infrared light and/or configured to have a scanning frequency of between 1-20 Hz. Most typically, the 2D scan area extends up to a 12 m linear distance from the LIDAR sensor.

It is further contemplated that the controller is configured to detect or identify the movement of the object, the controller is configured to identify the object as an automobile, a human, or an animal such as a pet, and/or the controller is configured to detect or identify the object when the object has a minimum dimension of at least 5 cm. Where desired, the access control system may further include a second LIDAR sensor that may optionally have a second 2D scan area that is typically parallel to the 2D scan area. Likewise, contemplated systems may include a video sensor and/or a photocell sensor coupled to the controller. In such a case, the controller may be configured to change the movement of the movable barrier using data from the LIDAR sensor, the video sensor, and/or photocell sensor.

In another aspect of the inventive subject matter, the inventors contemplate a method of controlling a motion of a movable barrier. Most typically, such method will include a step of moving a movable barrier between a first position and a second position, wherein the barrier blocks access therethrough when the barrier is in the first position and wherein the barrier allows access therethrough such as to a restricted area when the barrier is in the second position. In a further step, a LIDAR sensor is used during movement of the barrier, wherein the LIDAR sensor is configured to sense an object within a 2D scan area adjacent to the movable barrier, and wherein the 2D scan area is offset from and substantially parallel to the movable barrier while the movable barrier moves from the first position to the second position. In yet another step, a controller is employed that is coupled to an operator of the movable barrier and the LIDAR sensor to change the speed of movement of the movable barrier or interrupt the movement altogether upon detection or identification of an object within the 2D scan area.

Various objects, features, aspects, and advantages will become more apparent from the following detailed description of preferred embodiments, along with the accompanying drawing in which like numerals represent like components.

DETAILED DESCRIPTION

The inventors have discovered that one or more LIDAR sensors can be used to assist in the control and/or operation of various access control devices, and especially to increase safety in the operation of movable gates or other movable barriers. In this context, it should be appreciated that the use of LIDAR sensors advantageously enables object detection, identification, and differentiation that is not achievable using simple photocell sensors. Likewise, object detection, identification, and differentiation are significantly simplified relative to image or video analysis. In addition, the use of LIDAR sensors is less susceptible to various environmental factors known to interfere with the use of photocell sensors and/or image or video analysis (e.g., rain, snow, fog, direct and reflected light, etc.)

Figure 1:
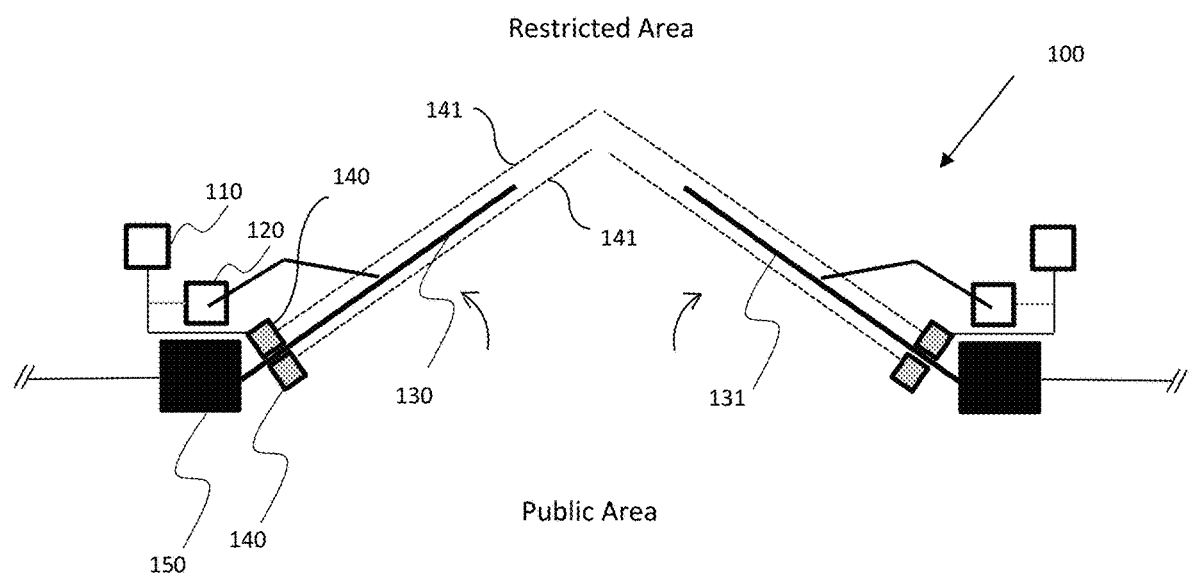
FIG. 1 depicts a schematic illustration of a LIDAR-assisted access control system according to the inventive subject matter.

One exemplary system is schematically depicted in FIG. 1 where an access control system 100 has a pair of gate panels 130 and 131 that swing open from a first closed position to a second open position to provide access therethrough, such as for example from a public area to a restricted (e.g., residential or otherwise secure) area. In other circumstances, the gates may allow access therethrough for other purposes, such as traffic flow management, for example, to continue driving on the same road after paying a toll, etc. as the invention is not limited in this regard. The following description refers to one of the gate panels although the same mechanism is applied to both. The gate panel 130 is pivotably coupled to a respective gate post 150. Coupled to each of the gate panels are LIDAR sensors 140. In the example of FIG. 1 two LIDAR sensors 140 are used on each side of the gate panel 130 and oriented such that a 2D scan area 141 is horizontally offset from and substantially parallel to each respective gate panel 140. As will be readily appreciated, the LIDAR sensor 2D scan area 141 will be at all times parallel to the gate panel 140 and so provide an immediate and substantially complete survey of the area ahead of the gate regardless of the movement of the gate. As FIG. 1 shows a view from the top of the gates, both the gate panel 140 and each respective 2D scan area 141 are situated in a pair of parallel vertical planes with a predetermined offset in between. A controller 110 is operatively coupled to the pair of LIDAR sensors 140 and to the operator 120 which is configured to control the operation of the gate panel 130 as a function of the signals received from the LIDAR sensors 140. It should be recognized that controller 110 may have additional functionalities such as controlling travel times and speed, torque control, override modes, timed modes, etc. It should also be further appreciated that one or more LIDAR sensors 140 can be installed such that the sensor(s) 140 is/are not directly coupled to the gate panel 130 or any structure associated with the gate panel to generate an 'invisible fence' in the vicinity of the gate. The offset of the 2D or 3D scan area or the distance of the LIDAR sensor(s) away from the corresponding gate panel may be at least 1-10 cm, or at least 50 cm, or at least 1 m, or at least 1.5 m, or at least 2 m, or at least 3 m, or at least 5 m or more away from the gate or gate panel as the invention is not limited in this regard.

Figure 2:
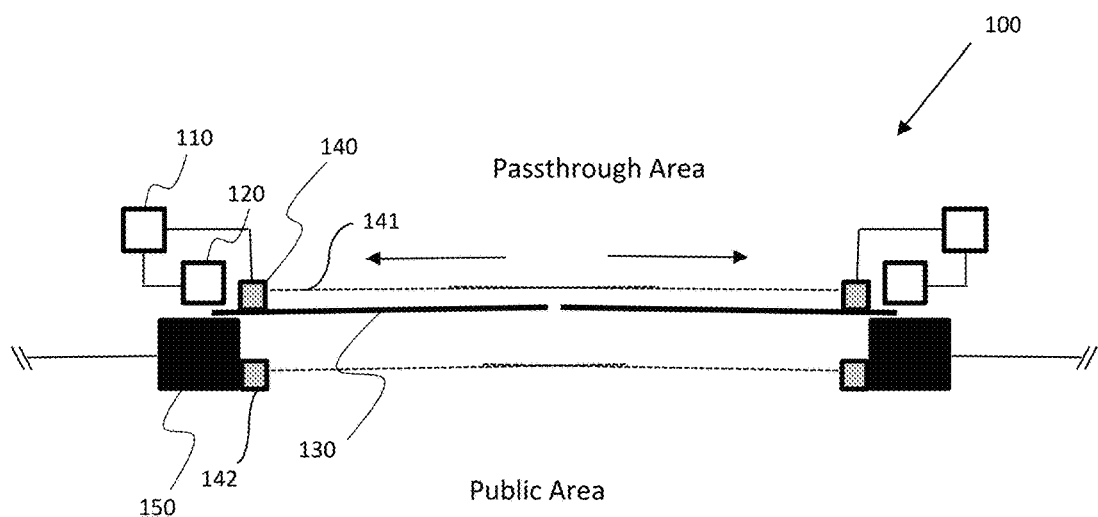
FIG. 2 depicts a schematic illustration of another LIDAR-assisted access control system according to the inventive subject matter.

Similarly, contemplated systems and methods can also be implemented in various sliding gate panels as is exemplarily and schematically illustrated in FIG. 2. Here, the gate panels 130 are slidably coupled to respective gate posts 150. Coupled to each side of the gate panel 130 are LIDAR sensors 140. In the first example of FIG. 1, two LIDAR sensors are shown as operatively coupled to either side of the gate panel. The same can be done in the second example. Alternatively, as shown in FIG. 2, one sensor 140 is coupled to the gate panel and the other LIDAR sensor 142 is coupled to the gate post 150. Most typically, both LIDAR sensors 140 and 142 are oriented such that a plane of the 2D scan area 141 is offset from and substantially parallel to the gate panel 130. Once more, it should be appreciated that the LIDAR sensor 2D scan area 141 will be at all times parallel to the gate panel 130 to provide an immediate and substantially complete survey of the area adjacent to the gate regardless of the movement of the gate. As in FIG. 1, a controller 110 is coupled to the LIDAR sensors 140, 142, and the operator 120, configured to control the operation of the gate panel 130 as a function of the signals received from the LIDAR sensors 140, 142. Moreover, it should be recognized that controller 110 may have additional functionalities such as controlling travel times and speed, torque control, override modes, timed modes, etc.

With respect to the LIDAR sensors, it is contemplated that the access control systems presented herein may have any number of LIDAR sensors to cover various areas that may interfere with safely operating the access system as the invention is not limited in this regard. However, it is typically preferred that the systems will have at least one LIDAR sensor, or at least two sensors, or at least three sensors, or at least four sensors. Preferably, but not necessarily, the LIDAR sensors are configured to cover a 2D scan area adjacent to the gate panels, but LIDAR sensors with 3D scan areas are also deemed suitable for use herein. Furthermore, it is generally preferred that the scan area of the LIDAR sensors is parallel to at least a portion of the gate panel. Most typically the scan area will be offset by at least 1-5 cm, or at least 5-10 cm, or at least 10-20 cm, or at least 20-50 cm, or even more. The extent of the offset is determined by the speed of gate operation and may be sufficient to at least slow down the gate or stop its movement altogether upon detecting an obstacle in its path prior to the gate physically reaching and touching that obstacle. Likewise, while it is generally preferred that the 2D scan area is substantially parallel to the gate panel, it should be appreciated that the 2D scan area may also be at a preferably obtuse angle relative to the gate panel.

Where multiple LIDAR sensors are implemented, it should be recognized, however, that the scan area may be cover areas in addition to the LIDAR sensors that are coupled to the gate panel and/or gate posts. For example, additional LIDAR sensors may be positioned such that the scan area or scan volume (for 3D scan area) will cover access areas in the passthrough area and/or the public area, which may also include at least a portion of the area in which the gate moves. Thus, and viewed from a different perspective, at least some of the LIDAR sensors will be placed such that the scan area is moving as the gate panels move (typically in parallel), while other LIDAR sensors may be static and cover a scan area that includes the area in which the gate moves in addition to the passthrough area and public area.

Figure 3:
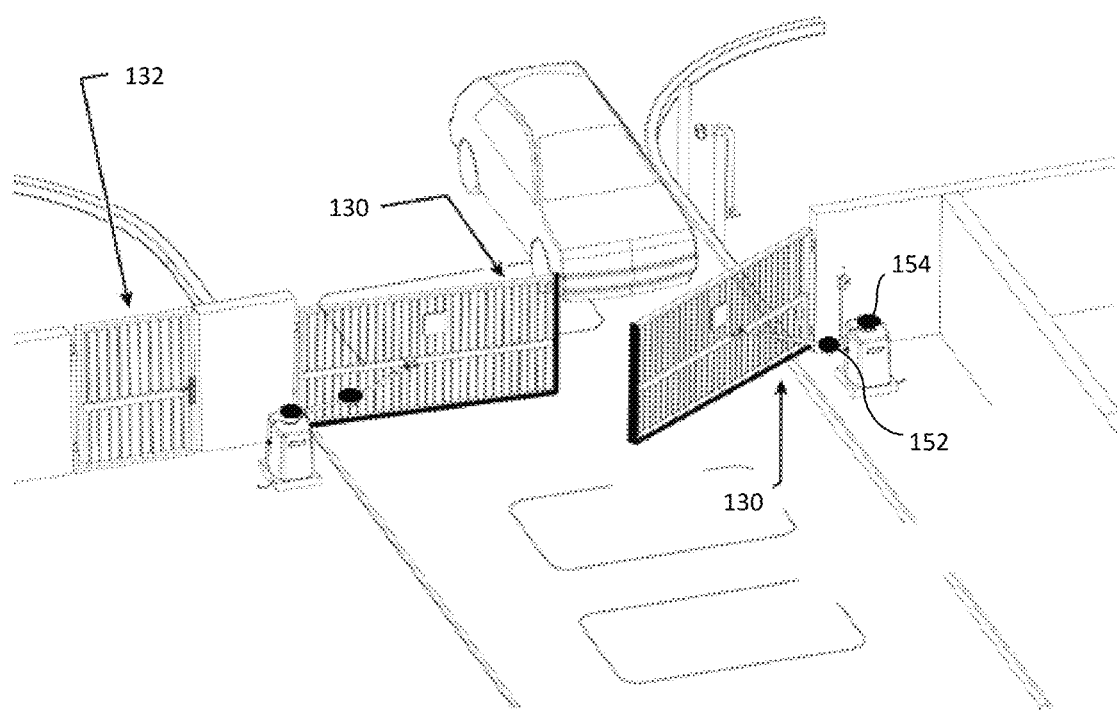
FIG. 3 depicts a schematic illustration of a further LIDAR-assisted access control system according to the inventive subject matter.

Consequently, where the scan area is a 2D scan area, the scan areas of two LIDAR sensors may be parallel (as is the case with sliding gate panels of FIG. 2) or at an angle relative to each other (as is the case with pivoting gate panels of FIG. 1). While in more typical embodiments the 2D scan areas will have a generally vertical orientation, LIDAR sensors may also be positioned such that the 2D scan areas may have a horizontal orientation or an orientation that is angled relative to a horizontal orientation (e.g., between 1-30 degrees, or between 30 and 45 degrees, or more). As will be readily appreciated, the LIDAR sensors can be coupled in various places suitable for the operation of the system as described herein, with exemplary locations including the gate panel 130, pedestrian gate 132, the gate post 150, various external structures such as walls associated with the gate, a pole placed in the proximity of the gate (in the restricted and/or public area), a guard station, etc. In further contemplated aspects, the LIDAR sensor(s) can also be positioned on the gate arm's elbows 152 or on top of the operator machine 154 as is schematically illustrated in FIG. 3.

Therefore, it should be appreciated that LIDAR sensors, and especially 2D LIDAR sensors, can be used to detect the presence of objects/obstacles and/or movement in the proximity of the path of movement of the gate panel(s) where the 2D scan area is substantially vertical. Additionally, it should be recognized that 2D LIDAR sensors can also be installed such that the scan area is substantially horizontal, which may be particularly useful to detect entrapment from the movement of swing gate arms as exemplarily shown in FIG. 3. As will be readily appreciated the particular placement and scan area orientation can be adapted to particular needs. However, where multiple 2D LIDAR sensors are used, a first of the sensors will generally cover object detection/motion in the path of the moving gate, while a second of the sensors may cover areas outside the path of the moving gate to provide further safety.

In still further contemplated embodiments, it should be recognized that where multiple 2D LIDAR sensors are employed, the sensors may be stacked so that their respective scan areas may overlap, intersect or duplicate each other for assuring further safety of operation. Preferably, where the sensors are stacked, the scan areas will be substantially perpendicular to each other. Alternatively, suitable sensors also include 3D LIDAR sensors, which may detect the presence, velocity, and/or behavior of an object in the 3D scan volume. In some embodiments, a 3D LIDAR is operationally used similarly to a set or array of parallel 2D LIDARs. Most typically, the 3D LIDAR sensor will produce multiple (typically parallel or fanned) 2D scan areas. There are numerous 3D LIDAR sensors known in the art, and exemplary suitable 3D LIDAR sensors include those having multiple parallel 2D scanning layers (e.g., 24 parallel scanning layers as found in MRS6000 by SICK, Minneapolis, MN), and those having multiple solid state emitters and photosensors that define a radial scanning (e.g., directional 3D sensor that may fully accommodate the functionality given by an array or set of parallel 2D LIDAR sensors as found in Velarray H800 by Velodyne, San Jose, CA). Therefore, it should be recognized that the particular mechanism of laser scanning is not limiting to the inventive subject matter and may therefore vary considerably. For example, contemplated mechanisms include rotation of the laser and sensor body, use of a prism-based laser steering, etc.

It should still further be appreciated that the LIDAR sensors and associated data processing software are not only useful to detect the presence of an object in the scan area or scan volume, but that the data processing software may also perform algorithmic inference of movement such as from the use of one sensor's detecting an object's width over time or from combining multiple 2D lidars to infer a 3D understanding of moving, obstructing, or intruding objects. Furthermore, and depending on the particular needs, some LIDAR systems may use a relatively high scanning frequency and/or use certain techniques to approximately achieve the effect of a much higher scan frequency. Higher scanning frequency may be useful for detecting additional object characteristics, while slower scanning frequency may be sufficient for detecting the object itself, which is a minimum requirement for assuring the safety of gate operation.

Among numerous other options, exemplary LIDAR sensors include 360-degree 2D laser scanners with a range of about 10-15 m (0.2-100 m or more) that will produce point cloud data suitable for mapping, localization, and object/environment modeling. Various techniques can be used for postprocessing the successive scans using the point cloud data for characterizing the objects encountered during scanning. One suitable technique for post-processing of the successive scans is called Structure-from-Motion, or SfM. Generally speaking, the SfM technique involves the recognition and extraction of unique features from successive scans so that the geometrical relationship of successive scans can be determined in the relationship of one scan to the next. SfM technique allows reconstruction of a 3D image from a series of 2D scans recorded in a known succession.

Most typically LIDAR sensors of the present invention will operate with an IR low power (Class I) laser in a modulated pulse mode at a sampling frequency of at least 5,000 Hz, and more typically at least 8,000 Hz, and, in other examples, with a scanning frequency of between 1-20 Hz.

Preferably, the LIDAR sensor will have a distance resolution of less than 5 mm, or less than 3 mm, or less than 1 mm, with an angular resolution of less than 2 degrees, or less than 1 degree, or even smaller. For example, suitable LIDAR sensors are commercially available from Shanghai Slamtec Co., Ltd. (Shanghai, China) such as, for example, RPLIDAR A1, model A1M8.

With respect to controller 110, it should be appreciated that the controller will be operationally coupled to the LIDAR sensor(s) and that the controller will be programmed to detect and optionally identify or classify objects in the 2D or 3D scan area(s). For example, in some embodiments, the controller 110 will be programmed such that objects are detected based on at least one of a minimum predetermined size, shape, orientation, and motion. Among other options, minimum size detection may limit object detection to objects having a minimum smallest dimension of at least 2 cm, or at least 5 cm, or at least 10 cm, or at least 20 cm, or at least 50 cm. The minimum size of the object may be manually adjustable, for example, to account for seasonal changes such as falling leaves in the fall. In further embodiments, such adjustments are made automatically based on an internal clock and/or calendar.

Specific predetermined shapes will include generally vertical shapes with dimensions that are indicative of a person, or generally block-like shapes with dimensions that are indicative of a pet, or larger shapes that are indicative of an automobile (e.g., car, truck, etc.). Additionally, or alternatively, detected shapes that exhibit a specified minimum size (e.g., at least 5 cm) and move/change shape within the 2D or 3D scan area(s) may also trigger the controller to interfere with a routine movement of the gate. Using the specific programmed parameters, various classes of classified objects may trigger different specific responses of the controller. For example, where the object is classified as a person or pet, the controller may immediately stop the movement of the gate. On the other hand, where the object is classified as an automobile, the controller may stop and then reverse the movement of the gate. On the other hand, where the object is determined to be below a predetermined parameter threshold (e.g., size or movement) the controller may take no deviation from an ongoing action that is already in progress.

Once the object near the gate is detected, the controller is triggered to interfere with the gate movement as described above. The controller may be further programmed to operate differently depending on the type of object it encountered. In particular, the controller may be programmed to halt the movement of the gate for a predetermined length of time and continue scanning the area to see if the detected object is no longer present. In that case, the movement of the gate may be resumed. In other examples, a warning audio signal (a beep or a siren for example) or a warning visual signal (a flashing light) may be activated in an attempt to cause the person or an animal to move away from the gate. In other yet examples, the controller may be programmed to return the gate to the closed position, unless another object is detected to be in its path.

Therefore, in most typical embodiments, the controller will provide software in one or more modules that are suitable for data processing, detection, object identification, and/or object classification (which may be based on a commercially available SDK). As will be readily appreciated, the software module(s) can then be integrated with further control functions of the controller that directs the operation of the gate operator (typically using an electrical motor as motive force). As already noted above, the controller will be programmed to initiate, halt, and/or modify an operational parameter of the gate operator, including halting the operator, reducing the speed of the gate movement, reversing the direction of the gate movement, etc. Consequently, it should be appreciated that the LIDAR sensor systems and methods according to the inventive subject matter can be implemented as a stand-alone solution for a new installation of an access control system or may be provided as an upgrade or add-on to an existing access control system.

In still further contemplated embodiments, it should be appreciated that the systems and methods presented herein may further integrate additional control elements, and especially contemplated control elements will include one or more video sensors (VIS and/or IR sensors, typically integrated with camera systems) and/or photocell sensor that are coupled to the controller. Such additional systems may serve as redundant systems in case of failure of the LIDAR components, or to augment or complement existing LIDAR-based systems. For example, a video-based component may help classify objects and/or qualify signals from the LIDAR sensors. Such video systems are especially beneficial to identify further spatial constraints that a LIDAR sensor may not always detect (e.g., loads extending from a roof rack) due to size and/or position. On the other hand, a photocell-based component may detect the length of an object (e.g., car/truck/trailer/RV, etc.) and assist in the operation of the gate operator.

In yet further contemplated methods, a LIDAR or other sensor (e.g., ultrasound park assist sensor) may also be mounted on an automobile and provide raw signals or other positional information to the controller of the access control, typically via Bluetooth, WiFi, or NFC signal. Communication with such external sensors may be automatically initiated by the controller, or upon user interaction.

It should be noted that any language directed to a computer should be read to include any suitable combination of computing devices, including servers, interfaces, systems, databases, agents, peers, engines, modules, controllers, or other types of computing devices operating individually or collectively. One should appreciate the computing devices comprise a processor configured to execute software instructions stored on a tangible, non-transitory computer-readable storage medium (e.g., hard drive, solid-state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet-switched network.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the full scope of the present disclosure, and does not pose a limitation on the scope of the invention otherwise claimed. No language in the specification should be construed as indicating any non-claimed element essential to the practice of the claimed invention.

It should be apparent to those skilled in the art that many more modifications besides those already described are possible without departing from the full scope of the concepts disclosed herein. The disclosed subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

What is claimed is:

1. An access control system, comprising:
   a movable barrier movably coupled to a stationary structure;
   wherein the movable barrier is movable between a first position and a second position, wherein the barrier blocks access therethrough when the barrier is in the first position and wherein the barrier allows access therethrough when the barrier is in the second position;
   a LIDAR sensor configured to sense an object within a 2D scan area, wherein the 2D scan area extends up to a 12 m linear distance from the LIDAR sensor, wherein the LIDAR sensor is operably coupled to the moving barrier or the stationary structure such that the 2D scan area is offset from and substantially parallel to the movable barrier while the movable barrier moves from the first to the second position; and
   a controller coupled to an operator of the movable barrier and the LIDAR sensor, wherein the controller is configured to change movement of the movable barrier upon detection or identification of an object in the 2D scan area.

2. The access control system of claim 1, wherein the movable barrier is configured to pivotably move between the first position and the second position.

3. The access control system of claim 1, wherein the movable barrier is configured to slidably move between the first position and the second position.

4. The access control system of claim 1, wherein the change in movement caused by the controller is slowing down the movement, halting the movement, or reversing the movement of the movable barrier.

5. The access control system as in claim 1, wherein the LIDAR sensor is configured to use infrared light.

6. The access control system as in claim 1, wherein the LIDAR sensor is configured to have a scanning frequency of between 1-20 Hz.

7. The access control system as in claim 1, wherein the offset of the 2D scan area from the movable barrier is between 1 and 20 cm.

8. The access control system as in claim 1, wherein the change of movement is a reduced speed of movement or an interruption of movement.

9. The access control system as in claim 1, wherein the controller is configured to detect or identify movement of the object, and/or wherein the controller is configured to identify the object as an automobile, a human, or a pet.

10. The access control system as in claim 1, wherein the controller is configured to determine a size of the object, the position of the object, the position of the object relative to the bounds of the 2D scan area, and/or the position of the object relative to the movable barrier.

11. The access control system as in claim 1, wherein the controller is configured to detect or identify the object when the object has a minimum dimension of at least 5 cm.

12. The access control system as in claim 1 further comprising a second LIDAR sensor, optionally wherein the second LIDAR sensor has a second 2D scan area that is parallel to the 2D scan area.

13. The access control system of claim 1 wherein the LIDAR sensor is a 3D LIDAR sensor producing a plurality of 2D scanning layers.

14. The access control system as in claim 1 further comprising a video sensor and/or a photocell sensor operably coupled to the controller.

15. The access control system of claim 14, wherein the controller is further configured to change movement of the movable barrier using data from the LIDAR sensor, the video sensor, and/or the photocell sensor.

16. A method of controlling motion of a movable barrier, the method comprising the steps of:
   moving a movable barrier between a first position and a second position, wherein the barrier blocks access therethrough when the barrier is in the first position and wherein the barrier allows access therethrough when the barrier is in the second position;
   operating a LIDAR sensor during the step of moving of the movable sensor, wherein the 2D scan area extends up to a 12 m linear distance from the LIDAR sensor, wherein the LIDAR sensor is configured to sense an object within a 2D scan area, and wherein the 2D scan area is offset from and substantially parallel to the movable barrier while the movable barrier moves from the first position to the second position; and
   operating a controller that is operatively coupled to an operator of the movable barrier and the LIDAR sensor to change movement of the movable barrier upon detection or identification of an object in the 2D scan area.

17. The method of claim 16, wherein the movable barrier is configured to pivotably move between the first position and the second position.

18. The method of claim 16, wherein the movable barrier is configured to slidably move between the first position and the second position.

19. The method of claim 16, wherein the step of operating the controller to change movement of the movable barrier further comprising slowing down the movement, halting the movement, or reversing the movement of the movable barrier upon detecting of the object in the 2D scan area.

20. The method of claim 16, wherein the LIDAR sensor uses infrared light.

21. The method of claim 16, wherein the LIDAR sensor has a scanning frequency of between 1-20 Hz.

22. The method of claim 16, wherein the offset between the 2D scan area and the movable barrier is between 1 and 20 cm.

23. The method of claim 16, wherein the change of movement is accompanied by activating a warning audio or visual signal.

24. The method of claim 16, wherein the controller is operated to detect or identify movement of the object.

25. The method of claim 16, wherein the controller is configured to identify the object as an automobile, a human, or a pet.

26. The method of claim 16, wherein the controller detects or identifies the object when the object has a minimum dimension of at least 5 cm.

27. The method of claim 16 further comprising a step of operating a second LIDAR sensor.

28. The method of claim 27, wherein the second LIDAR sensor has a second 2D scan area that is parallel to the 2D scan area.

29. The method of claim 16 further comprising a step of using a video sensor and/or a photocell sensor operably coupled to the controller.

30. The method of claim 29, wherein the controller changes movement of the movable barrier using data from the LIDAR sensor, the video sensor, and/or the photocell sensor.

\* \* \* \* \*